(12) United States Patent
Nassiri-Toussi et al.

(10) Patent No.: US 7,580,428 B1
(45) Date of Patent: *Aug. 25, 2009

(54) 3GPP WCDMA RECEIVER USING PIPELINED APPARATUS AND METHOD FOR PERFORMING CELL SEARCHES

(75) Inventors: Karim Nassiri-Toussi, Belmont, CA (US); Mohammad Reza Shikh-Bahaei, Maida Vale (GB); Ali D. Pirooz, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/725,575

(22) Filed: Mar. 19, 2007

Related U.S. Application Data

(63) Continuation of application No. 10/232,775, filed on Aug. 31, 2002, now Pat. No. 7,194,011.

(51) Int. Cl.
*H04J 3/06* (2006.01)
(52) U.S. Cl. ..................... 370/503; 370/320
(58) Field of Classification Search .......... 370/335, 370/350, 324, 503, 395.62, 509–515, 479, 370/354, 365, 367, 342, 331, 320, 252, 255, 370/458, 321, 326, 338, 328, 347, 310.2, 370/441
See application file for complete search history.

(56) References Cited

U.S. PATENT DOCUMENTS

| 6,385,259 | B1 * | 5/2002 | Sung et al. | 375/343 |
|---|---|---|---|---|
| 6,571,099 | B1 * | 5/2003 | Kim et al. | 455/442 |
| 6,728,203 | B2 * | 4/2004 | Wang | 370/210 |
| 6,775,318 | B2 * | 8/2004 | Chen et al. | 375/149 |
| 6,965,586 | B1 * | 11/2005 | Maruyama | 370/335 |
| 7,072,318 | B2 * | 7/2006 | Shoji et al. | 370/335 |
| 7,110,376 | B2 * | 9/2006 | Lindoff et al. | 370/331 |
| 7,110,438 | B2 | 9/2006 | Ho et al. | |
| 7,194,011 | B1 * | 3/2007 | Nassiri-Toussi et al. | 370/503 |
| 7,327,779 | B1 * | 2/2008 | Lugil et al. | 375/141 |
| 2003/0193926 | A1 | 10/2003 | Lindoff et al. | |

* cited by examiner

*Primary Examiner*—Brenda Pham

(57) ABSTRACT

A pipelined cell search apparatus having a primary search stage, a secondary stage and a Gold code stage. The primary stage receives a primary synchronization channel (P-SCH) signal, detects a maximum peak of a slot boundary in the P-SCH signal, and generates slot timing data from the maximum peak. The secondary search stage receives a secondary synchronization channel (S-SCH) signal and the slot timing data, and detects in the S-SCH signal a maximum peak of a frame boundary. The secondary search stage generates frame timing data and a group ID of a base station transmitting the P-SCH signal and the S-SCH signal. The Gold code search stage receives a common control pilot channel (CPICH) signal, the slot timing data, the frame timing data, and the group ID and detects in the CPICH signal a maximum peak associated with a Gold code of the base station.

20 Claims, 8 Drawing Sheets

3GPP WCDMA RECEIVER USING PIPELINED APPARATUS AND METHOD FOR PERFORMING CELL SEARCHES

CROSS-REFERENCE TO RELATED APPLICATIONS

This application is a continuation of prior U.S. patent application Ser. No. 10/232,775 filed on Aug. 31, 2002 now U.S. Pat. No. 7,194,011.

The present invention is related to that disclosed and claimed in the following United States Non-Provisional Patent Applications:

Ser. No. 10/232,851, filed concurrently herewith, entitled "APPARATUS AND METHOD FOR SECONDARY SYNCHRONIZATION CHANNEL DETECTION IN A 3GPP WCDMA RECEIVER."

TECHNICAL FIELD OF THE INVENTION

The present invention relates generally to wireless receivers and, more particularly, to a pipelined apparatus and method for performing cell searches for base stations in a wireless network based on the 3GPP WCDMA specification.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication devices has created a corresponding demand for technical improvements to such devices.

Generally speaking, wireless system designers attempt to minimize the cost of conventional radio receivers while improving the performance of such devices. Performance improvements include, among other things, lower power consumption, greater range, increased receiver sensitivity, lower bit error rates (BER), higher transmission rates, and the like.

A mobile station (or wireless device) routinely performs a cell search (or synchronization) function to detect and acquire the base stations of a wireless network in the vicinity of the wireless device. Fast detection of the base stations is critical to the performance of both the mobile station and the wireless network, particularly in the new 3GPP wideband code division multiple access (WCDMA) wireless systems currently under development. Fast detection of base stations allows a mobile station to access a wireless network more rapidly (i.e., reduces acquisition delay). Fast detection of base stations also enables the mobile station and the wireless network to perform faster handoffs between base station cell sites or between sectors of the same base transceiver subsystem (BTS) of a base station. Additionally, fast detection reduces the number of calls that are dropped during the handoff process.

However, the speed with which conventional mobile stations perform cell searches in $3^{rd}$ Generation Partnership Project (3GPP) WCDMA networks is relatively limited due to the complexity of the signal processing involved. A conventional mobile station typically performs three search stages in sequence. First, a primary search stage detects slot boundaries in the pilot channel signals of the wireless network. Next, a secondary search stage detects frame boundaries of the pilot channel signals. Finally, a tertiary (third) search stage detects the Gold codes for the is base station. When all three stages are complete, a reset signal resets the three search stages and the process repeats. If noise or multipath fading causes the signal to be received improperly, the cell search process cannot resume until all three stages are complete and the next reset signal occurs. This reduces the speed and efficiency of the cell search process.

The speed of acquisition is also reduced by false lock conditions. One of the main goals in designing the cell-search module is to reduce the false lock probability at the final stage. False lock of the searcher, namely the condition in which the third stage of the process locks to an incorrect base station and/or frame timing, results in further delays during post-processing of the erroneous acquired timing/code. This delay, apart from being intolerable for the user, reduces the battery life of the mobile terminal.

Therefore, there is a need in the art for improved wireless mobile station receivers. In particular, there is a need for improved apparatuses and methods for performing synchronization functions (or cell searches). More particularly, there is a need for wireless receivers that can more rapidly search for and acquire the base stations of a wireless network cell site, with a reduced number of false lock conditions.

SUMMARY OF THE INVENTION

The present invention performs the cell search for the common pilot channel (CPICH) signal of a wireless network, such as a 3GPP WCDMA wireless network, using a three stage pipelined processing technique. In the first cell search stage, the received signal is correlated with the primary synchronization (Primary Sync) pattern (in a coherent/non-coherent fashion) and correlation peaks are detected. This part is implemented mostly in hardware and runs continuously, unless the receiver front-end circuitry is turned off. Next, appropriate peaks (if any) are selected by firmware (i.e., processor and memory executing code) and the slot-boundary corresponding to these peaks is determined. In the case of an initial acquisition, only one peak is selected and the frequency offset (FO) corresponding to that peak is coarsely estimated and corrected.

In the second cell search stage, for each Primary Sync correlation peak selected by the firmware in the first cell search stage, the received signal is correlated with a Secondary Sync pattern based on the corresponding slot-boundary. Based on correlation results, the frame boundary and code-group index are detected if a certain threshold is passed. This process is repeated as long as there are Primary Sync peaks selected by the firmware in the first cell search stage.

In the third cell search stage, for each frame boundary and code group index detected in the second search stage, the received signal is correlated with related P-CPCH sequences and the correct Gold code is detected if a certain threshold is passed. The first, second and third cell search stages are implemented in hardware and firmware. The third cell search stage processing is shorter than the second stage, so the three stages may be pipelined.

To address the above-discussed deficiencies of the prior art, it is a primary object of the present invention to provide a pipelined apparatus for performing cell searches for use in a receiver of a wireless network. According to an advantageous embodiment of the present invention, the pipelined apparatus comprises: 1) a primary search stage capable of receiving a primary synchronization channel (P-SCH) signal and detecting therein a first maximum peak associated with a slot boundary in the P-SCH signal, wherein the primary search stage generates slot timing data from the maximum peak; 2) a secondary search stage capable of receiving a secondary synchronization channel (S-SCH) signal and the slot timing data from the primary search stage and detecting in the S-SCH signal a second maximum peak associated with a frame boundary, wherein the secondary search stage generates from the frame boundary and the slot timing data frame timing data and a group ID of a base station transmitting the P-SCH signal and the S-SCH signal; and 3) a Gold code search stage capable of receiving i) a common control pilot channel (CPICH) signal, ii) the slot timing data from the primary search stage, and iii) the frame timing data and the group ID from the secondary search stage and detecting in the CPICH signal a third maximum peak associated with a Gold code of the base station.

According to one embodiment of the present invention, the primary search stage operates substantially continuously.

According to another embodiment of the present invention, the primary search stage and the secondary search stage operate at least partially simultaneously.

According to still another embodiment of the present invention, the secondary search stage and the Gold code search stage operate at least partially simultaneously.

According to yet another embodiment of the present invention, the primary search stage, the secondary search stage, and the Gold code search stage operate at least partially simultaneously.

According to a further embodiment of the present invention, the primary search stage compares the first maximum peak to a first threshold level and generates the slot timing data only if the first maximum peak exceeds the first threshold level.

According to a still further embodiment of the present invention, the secondary search stage is enabled by receipt of the slot timing data from the primary search stage.

According to a yet further embodiment of the present invention, the secondary search stage compares the second maximum peak to a second threshold level and generates the frame timing data and the group ID only if the second maximum peak exceeds the second threshold level.

In one embodiment of the present invention, the Gold code search stage is enabled by receipt of the frame time data and the group ID from the secondary search stage.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile station receiver.

Figure 1:
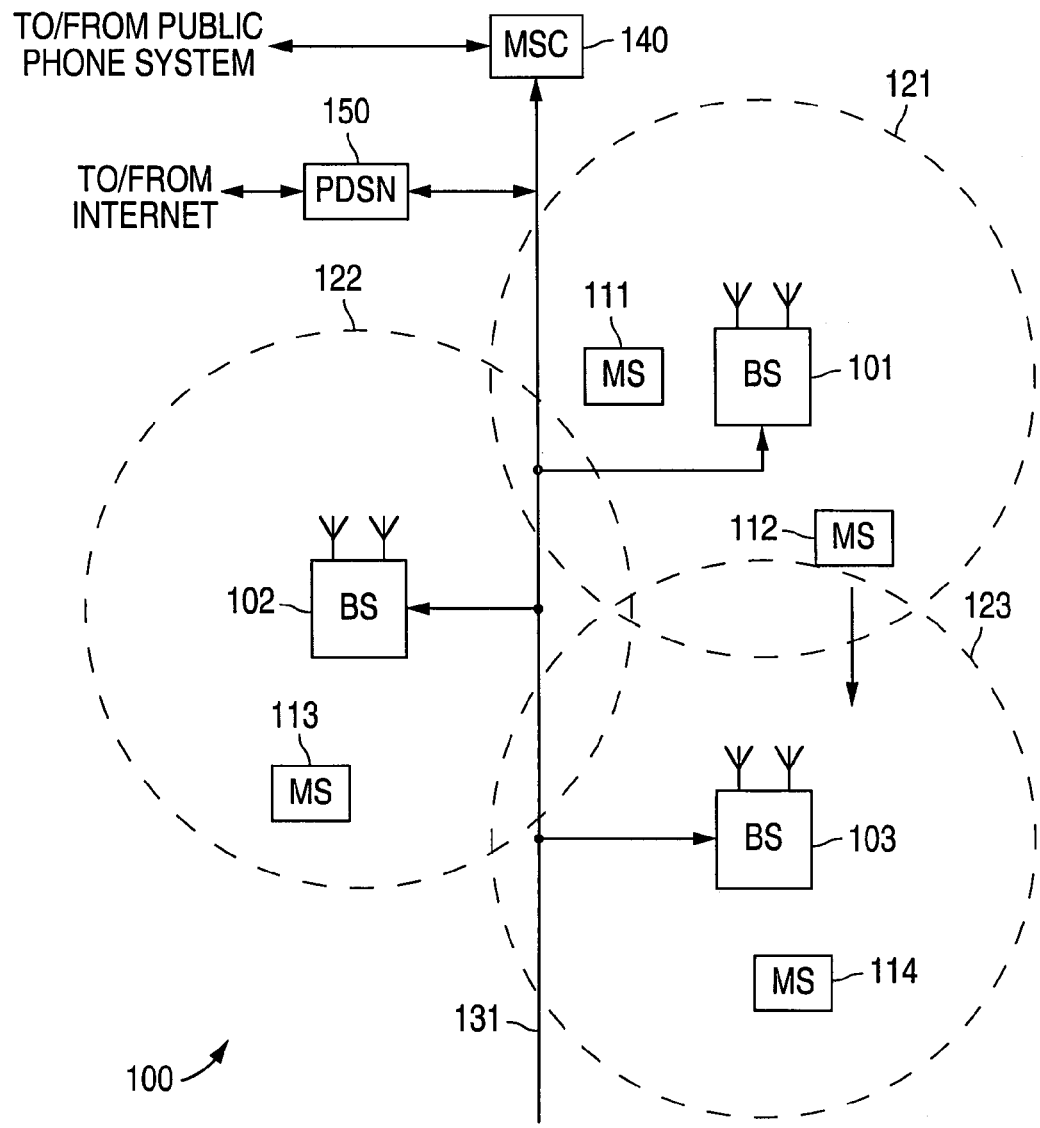
FIG. 1 illustrates an exemplary wireless network according to one embodiment of the present invention.

FIG. 1 illustrates exemplary wireless network 100 in which code division multiple access (CDMA) mobile station receivers according to the principles of the present invention may be used. Wireless network 100 comprises a plurality of cell sites 121-123, each containing a base station (BS), such as BS 101, BS 102, or BS 103. Base stations 101-103 communicate with a plurality of mobile stations (MS) 111-114 over wideband code division multiple access (WCDMA) channels according to the $3^{rd}$ Generation Partnership Project (3GPP) specification. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites often have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site.

BS 101, BS 102 and BS 103 transfer voice and data signals between each other and the public switched telephone network (PSTN) (not shown) and the Internet via communication line 131, mobile switching center (MSC) 140, and packet data serving node (PDSN) 150. MSC 140 is a switching device that provides services and coordination between the subscribers in a wireless network and external networks, such as the PSTN or Internet.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Each one of MS 111-114 routinely performs cell searches to detect the base stations of a wireless network in the vicinity of the mobile stations. Whenever one of MS 111-114 is turned on, an initial cell search is performed in order to search for and acquire at least one of base stations 101-103 of wireless network 100. Thereafter, each mobile station continues to perform cell searches in order to determine the strongest base station(s) in the vicinity and to identify available base stations to which the mobile station may be transferred in case it is necessary to perform a handoff. To improve the efficiency of these cell searches, the present invention provides a unique and novel apparatus and related method that perform cell searches using a three stage pipelined processing technique.

Figure 2:
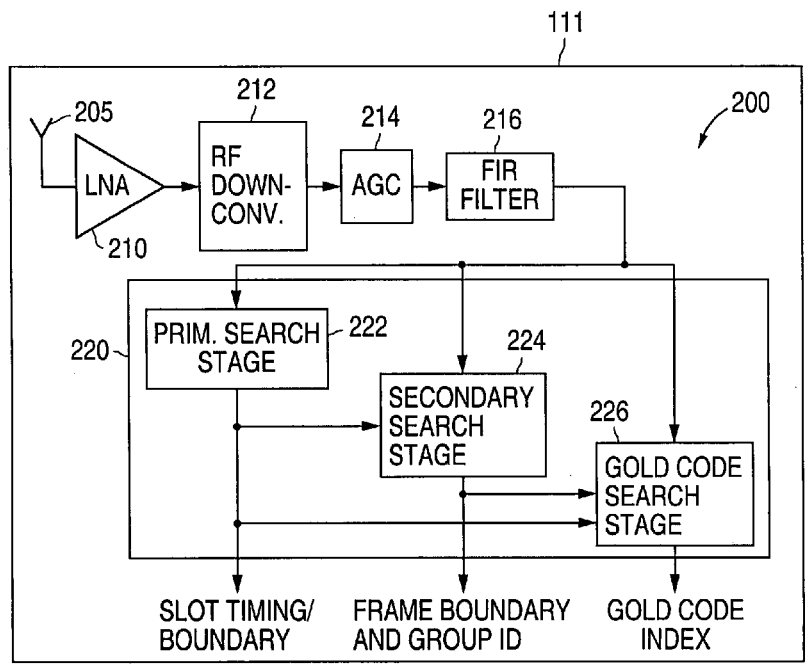
FIG. 2 is a high-level block diagram of an exemplary mobile station receiver containing a pipelined cell search block according to one embodiment of the present invention.

FIG. 2 is a high-level block diagram of exemplary mobile station 111, which implements code division multiple access (CMDA) receiver 200 containing pipelined cell search block 220 according to one embodiment of the present invention. CDMA receiver 200 comprises antenna 205, low-noise amplifier (LNA) 210, radio frequency (RF) down-converter 212, automatic gain control (AGC) 214, finite impulse response (FIR) filter 216, and pipelined cell search block 220. Pipelined cell search block 220 comprises primary search stage 222, secondary search stage 224, and Gold code search stage 226.

Antenna 205 receives the incoming common control pilot channel (CPICH) signal, primary synchronization channel (PSCH) signal, secondary synchronization channel (SSCH) signal, broadcast channel (BCH) signal, and other forward channel signals transmitted by one or more of BS 101-103 according to the 3GPP WCDMA specification. LNA 210 amplifies the received CDMA signals to an appropriate level for RF down-converter 212. RF down-converter 212 down-converts the amplified RF signal to a baseband or an intermediate frequency (IF) output signal. According to an exemplary embodiment of the present invention, the output of RF down-converter 212 also comprises an analog-to-digital converter (ADC) stage that digitizes the baseband or IF output signal into a stream of digital samples.

Depending on the type of modulation used, the baseband or IF output signal may be, for example, a binary phase-shift keying (BPSK) signal, a quadrature phase-shift keying (QPSK) signal, a 16 quadrature amplitude modulated (QAM) signal, or the like. According to an advantageous embodiment of the present invention, RF down-converter 212 down-converts a QPSK signal and outputs a stream of in-phase (I) signal samples and a stream of quadrature phase (Q) samples to AGC 214. AGC 214 adjusts the gain of the I and Q samples for subsequent filtering by FIR filter 216.

The filtered I and Q samples are then input to primary search stage 222, secondary search stage 224, and Gold code search stage 226. As will be explained below in greater detail, primary search stage 222 detects the slot boundary and timing information using the primary synchronization channel (PSCH) signal. The slot timing information is used to enable second search stage 224, which then detects the frame boundary and the group ID for the local base stations using the secondary synchronization channel (SSCH) signal.

Finally, Gold code search stage 226 uses the frame boundary, slot boundary and group ID information to determine the Gold code index in the common control pilot channel (CPICH) signals transmitted by the local base stations. Unlike conventional CDMA cell search algorithms, after an initial acquisition phase by primary search stage 222, secondary search stage 224 and Gold code search stage 226 operate in parallel with each other and with primary search stage 222.

In an advantageous embodiment, the present invention operates in accordance with the 3GPP WCDMA standard, so that forward channel data are transmitted to mobile stations 111-114 in frames. The frame rate is 100 frames/second (i.e., frame rate=100 Hz). Each frame contains fifteen (15) slots, giving a 1500 Hz slot rate. Each slot comprises ten (10) data symbols, giving a 15 KHz symbol rate. Each data symbol is spread using a 256 chip spreading code, giving a 3.84 MHz chip rate. Additionally, the ADC stage in the output of RF down-converter 212 samples the in-phase (I) and quadrature (Q) signals at twice the chip rate (i.e., 2 samples per chip), giving a 7.68 MHz sampling rate. Thus, there are a total of 512 samples for each symbol and 5120 samples for each slot.

Also, in accordance with the 3GPP WCDMA standard, the primary synchronization channel (PSCH) signal contains a 256-chip code word that repeats with a period equal to one slot duration. The same complex-valued, unmodulated code word is used in every cell. Thus, the first timing information, namely the beginning of each slot, is obtained from the primary synchronization channel in primary search stage 222.

Figure 3:
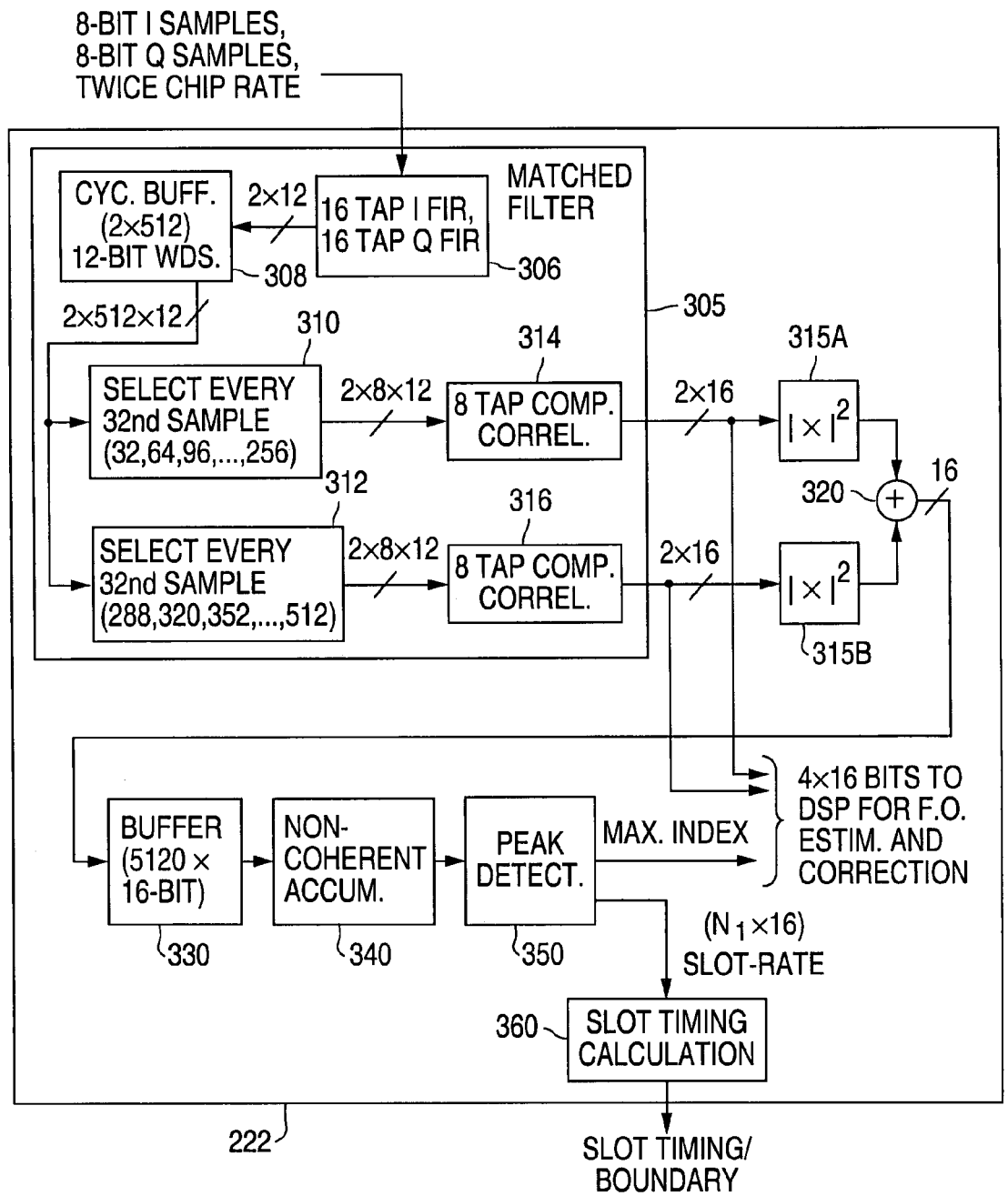
FIG. 3 is a detailed block diagram of the primary search stage of the exemplary mobile station receiver according to an exemplary embodiment of the present invention.

FIG. 3 is a detailed block diagram of primary search stage 222 of exemplary mobile station 111 according to an exemplary embodiment of the present invention. Primary search stage 222 comprises matched filter 305, squaring units 315A and 315B, adder 320, buffer 330, non-coherent accumulator 340, peak detector 350, and slot timing calculation block 360. Most of the circuit blocks in primary search stage 222 are implemented in hardware, slot timing calculation block 360 may be implemented in firmware. Primary search stage 222 runs continuously as long as the front end of receiver 200 operates.

Matched filter 305 receives the output of FIR filter 216 as a stream of 8-bit in-phase (I) samples at twice the chip rate and a stream of 8-bit quadrature (Q) samples at twice the chip rate. Matched filter 305 detects the unmodulated, complex-valued 256 chip code word in the primary synchronization channel (PSCH) signal. Matched filter 305 comprises finite impulse response (FIR) filter 312, cyclic buffer 308, select every $32^{nd}$ sample block 310, select every $32^{nd}$ sample block 312, 8-tap complex correlator 314, and 8-tap complex correlator 316. FIR filter 306 comprises a 16-tap in-phase (I) FIR filter that filters I samples and a 16-tap Q FIR filter that filters quadrature (Q) samples. FIR filter 306 operates at the chip rate. The outputs of FIR filter 306 are filtered 12-bit I and Q samples at twice the chip rate.

The outputs of FIR filter 306 are stored in cyclic buffer 308. Cyclic buffer 308 stores 512 entries, each entry containing a 12-bit I sample (i.e., 12-bit word) and a 12-bit Q sample (i.e., 12-bit word). All 512 I and Q entries in cyclic buffer 308 are available to select every $32^{nd}$ sample block 310 and select every $32^{nd}$ sample block 312. Select every $32^{nd}$ sample block 310 reads out every $32^{nd}$ entry (for a total of 8 entries) from cyclic buffer 308 and passes the eight 12-bit I samples and eight 12-bit Q samples (i.e., 2×8×12) to 8-tap complex correlator 314 for processing. Select every $32^{nd}$ sample block 310 then decrements and grabs another group of 8 entries that are spaced 32 entries apart. For example, during a first cycle, select every $32^{nd}$ sample block 310 reads entries [32, 64, 96, . . . , 256] from cyclic buffer 308. During the next cycle, select every $32^{nd}$ sample block 310 reads entries [31, 63, 95, . . . , 255] from cyclic buffer 308.

Select every $32^{nd}$ sample block 312 operates in a similar manner. Select every $32^{nd}$ sample block 312 reads out every $32^{nd}$ entry (for a total of 8 entries) from cyclic buffer 308 and passes the eight 12-bit I samples and eight 12-bit Q samples (i.e., 2×8×12) to 8-tap complex correlator 316 for processing. However, select every $32^{nd}$ sample block 312 is shifted 256 entries with respect to select every $32^{nd}$ sample block 310 and begins at entry 288. Select every $32^{nd}$ sample block 312 then decrements and grabs another group of 8 entries that are spaced 32 entries apart. For example, during a first cycle, select every $32^{nd}$ sample block 312 reads entries [288, 320, 352, . . . , 512] from cyclic buffer 308. During the next cycle, select every $32^{nd}$ sample block 312 reads entries [287, 319, 351, . . . , 511] from cyclic buffer 308.

The outputs of complex correlator 314 are filtered 16-bit I samples and filtered 16-bit Q samples. The outputs of complex correlator 316 also are filtered 16-bit I samples and filtered 16-bit Q samples. The four sets of I and Q samples are used for frequency offset (FO) estimation and correction.

The 16-bit I samples and 16-bit Q samples from complex correlator 314 are squared by squaring unit 315A to produce the magnitude ($I^2+Q^2$) for non-coherent detection. The 16-bit I samples and 16-bit Q samples from complex correlator 316 are squared by squaring unit 315B to produce the magnitude ($I^2+Q^2$) for non-coherent detection. The magnitude outputs from squaring units 315A and 315B are non-coherently added by adder 320 to produce a 16-bit result and the results are stored in buffer 330. Buffer 330 stores 5120 entries, wherein each entry is a 16-bit value. The 5120 entries are equivalent to all of the samples from an entire slot (i.e., 10 symbols).

The buffered entries in buffer 330 are sent to non-coherent accumulator 340 for summing. Non-coherent accumulator 5120 outputs accumulated values once every 5120 samples. Over the course of several slots, peaks are formed in the data output of non-coherent accumulator at each slot boundary. Peak detector 350 detects the peaks in the output of accumulator 340. Optionally, peak detector 350 may compare all peaks to a predetermined peak threshold value, referred to simply as Threshold 1. Threshold 1 may be fixed or may be varied according to the average power measured at the input to primary search stage 222. The circuit blocks that estimate the power and modify Threshold 1 are not shown in FIG. 3.

Peak detector 350 may disregard peaks that are not greater than Threshold 1. Of the remaining peaks, peak detector 350 identifies the highest peak (i.e., slot boundary) and its sample position in cyclic buffer becomes the Maximum Index value. The peak value outputs of peak detector 350 and the corresponding index values (or peak indices) are used by slot timing calculation block 360 to generate the slot timing/boundary information that is used by secondary search stage 224 and Gold code search stage 226.

Matched filter 305 is used instead of a single 256-tap FIR filter in order to reduce the effect of frequency offset. The outputs of 315A and 315B are non-coherently added. The superior performance of this approach is most evident in the presence of frequency offset. The vectors at the output of buffer 330 are accumulated over several slots in order to come up with more accurate results when detecting peaks and reducing the effect of noise.

Before data can be retrieved from the combined received signal, receiver 200 must recover the start of each frame as well. Further, receiver 200 must identify the set (i.e. Group ID) or base station to which the base station from which data is received belongs. For this purpose, the received signal from FIR filter 216 is input to the secondary synchronization channel (S-SCH) signal detector (i.e., secondary search stage 224), along with the output of the primary synchronization channel (P-SCH) signal detector (i.e., primary search stage 222) which indicates the slot time.

In contrast to the primary synchronization channel (P-SCH) signal, the secondary synchronization channel (S-SCH) signal varies from one base station to another. There are a total of sixteen (16) different sequences, each containing 256 chips, that may be used in the S-SCH signal by all base stations to generate 64 sequences of length fifteen (i.e., the number of slots per frame). The 256-chip S-SCH signal sequences are sent at the beginning of each slot in parallel with the primary S-SCH signal.

By detecting the S-SCH signal, receiver 200 obtains the frame synchronization. This is because the 64 different code sequences are chosen such that their cyclic shifts are unique. That is, the cyclic shift of a first sequence by L (for 0<L<16) is not equivalent to a cyclic shift of a second sequence or to another cyclic shift of the first sequence itself.

Furthermore, the 64 code words in the secondary synchronization channel (S-SCH) signal will match only one of the 64 different code groups of 8 scrambling codes each that are used by wireless network 100. Therefore, detection of the secondary synchronization channel (S-SCH) signal obtains the scrambling code group ID to which the base station belongs.

The 16 S-SCH signal codes are, as their primary counterparts, complex valued with identical real and imaginary components. Each code is constructed from element-wise multiplication of two 256-bit vectors. The first one of these two 256-bit vectors is the same for all 16 S-SCH signal codes, and is defined as:

$$z=[b,b,b,-b,b,b,-b,-b,b,-b,b,-b,-b,-b,-b,-b],$$  [Eqn. 1]

where $b=[a_1, -a_2]$, such that $a_1$ and $a_2$ denote the first and second 8-bit vectors resulting from partitioning vector "a" (defined in primary SCH definition) into two halves, respectively.

The second one of these two vectors is a Hadamard sequence of length 256, which is selected from the rows of Hadamard matrix $H_8$. Actually, the 16 S-SCH signal codes are differentiated by assigning different rows of matrix $H_8$ to them. Numbering the 256 rows of $H_8$ from the top, starting by row n=0, the $k^{th}$ S-SCH signal code (for k=1, 2, ..., 16), can be written as $$SSC_k=(1+j)h_p **z,$$  [Eqn. 2]

where $h_p$, p=16*(k−1), denotes the $p^{th}$ row of matrix $H_8$, and ** is an operator indicating the element-wise multiplication of two code words.

Passing the signals through a filter matched to the complex-valued $SSC_k$ code forms peaks corresponding to the starts of frames. The next step in S-SCH detection is to detect these peaks and obtain the time at which every peak occurs.

This matched filtering can be implemented in two main steps. First, the signal is correlated with the sequence, z (in Equation 1 above), and then is passed through Hadamard matched filters to search for the slot whose beginning is aligned with the start of a frame. Since there are sixteen (16) Hadamard codes used in the S-SCH signals, sixteen (16) correlators are employed for the second step.

Figure 4:
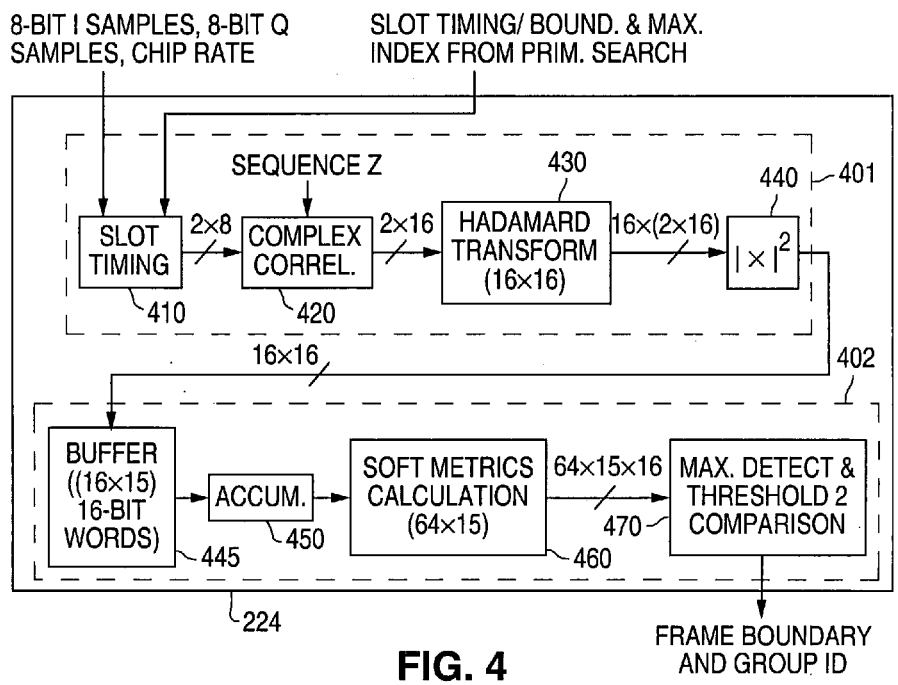
FIG. 4 is a detailed block diagram of the secondary search stage of the exemplary mobile station receiver according to an exemplary embodiment of the present invention.

FIG. 4 is a detailed block diagram of secondary search stage 224 of exemplary mobile station 111 according to an exemplary embodiment of the present invention. Secondary search stage 224 comprises slot timing block 410, complex correlator 420, Hadamard transform block 430, squaring unit 440, buffer 445, accumulator 450, soft metrics calculation block 460, and maximum detection and Threshold 2 comparison block 470. Dotted line boundary 401 indicates circuit blocks that may be implemented in hardware. Dotted line boundary 402 indicates circuit blocks that may be implemented in firmware.

Slot timing block 410 receives the 8-bit in-phase (I) samples and 8-bit quadrature (Q) samples from FIR filter 216 at the chip rate. Doubling sampling is not required since slot timing block 410 uses the slot timing and Maximum Index information from primary search stage 222 to properly align the received I and Q samples. Next, the I samples and Q samples are correlated by complex correlator 420 using the 256-bit sequence Z from above. The correlated output comprises 16-bit I signal values and a 16-bit Q signal values.

Next, the 16-bit I and Q signals are processed in Hadamard transform block 430. Hadamard transform block 430 comprises sixteen separate matched filters for performing the Hadamard transform. As noted above, each of the sixteen Hadamard matched filters search for the slot whose beginning is aligned with the start of a frame. Since there are sixteen (16) Hadamard codes used in the S-SCH signals, sixteen (16) Hadamard matched filters (i.e., correlators) are employed by Hadamard transform block 430. This produces 16 separate 16-bit I signal outputs and 16 separate 16-bit Q signal outputs.

For each of the 16 pairs of 16-bit I and Q signal value from Hadamard transform block 430, squaring unit 440 produces the magnitude ($I^2+Q^2$). The outputs of squaring block 440 are sixteen separate 16-bit values that are stored in buffer 445. Correlation with 16 Hadamard codes is repeated for the next 14 slots and the results for all 15 slots are stored in buffer 445. Thus, buffer 445 stores the outputs of squaring block 440 for an entire frame of 15 slots. The entries from all 15 slots stored in buffer 445 are sent to accumulator 450 for summing, thereby forming peaks in the data.

For each of the 64 code words (which are associated to various code groups) and for their 15 shifted versions, soft metric calculation block 460 calculates a soft metric (parameter) by invoking respective correlation values over each slot and summing up the soft values over 15 slots. Maximum detection and threshold 2 comparison block 470 detects the maximum value of the metrics over 64×15 code words. Next, maximum detection and Threshold 2 comparison block 470 compares the detected maximum value to Threshold 2. If it does not exceed Threshold 2, a "missing the synchronization" condition is reported. The outputs of maximum detection and Threshold 2 comparison block 470 are the frame boundary and the Group ID of the base stations in the vicinity of mobile station 111. The code word-associated group ID and frame timing are reported to Gold code search stage 226 for scrambling Gold code detection.

Threshold 2 is computed by scaling the estimated power of the received signal. The scaling factor is derived such that the false alarm rate is minimized while the missing probability is maintained at an acceptable low level for the overall acquisition time. Correlation of the received signal, which is already aligned to the start of a slot, with all possible 16 Hadamard code words is obtained for 15 slots. The corresponding correlation values are accumulated over two (or generally Nf) frames to obtain fifteen 16-tuple correlation vectors.

Figure 5:
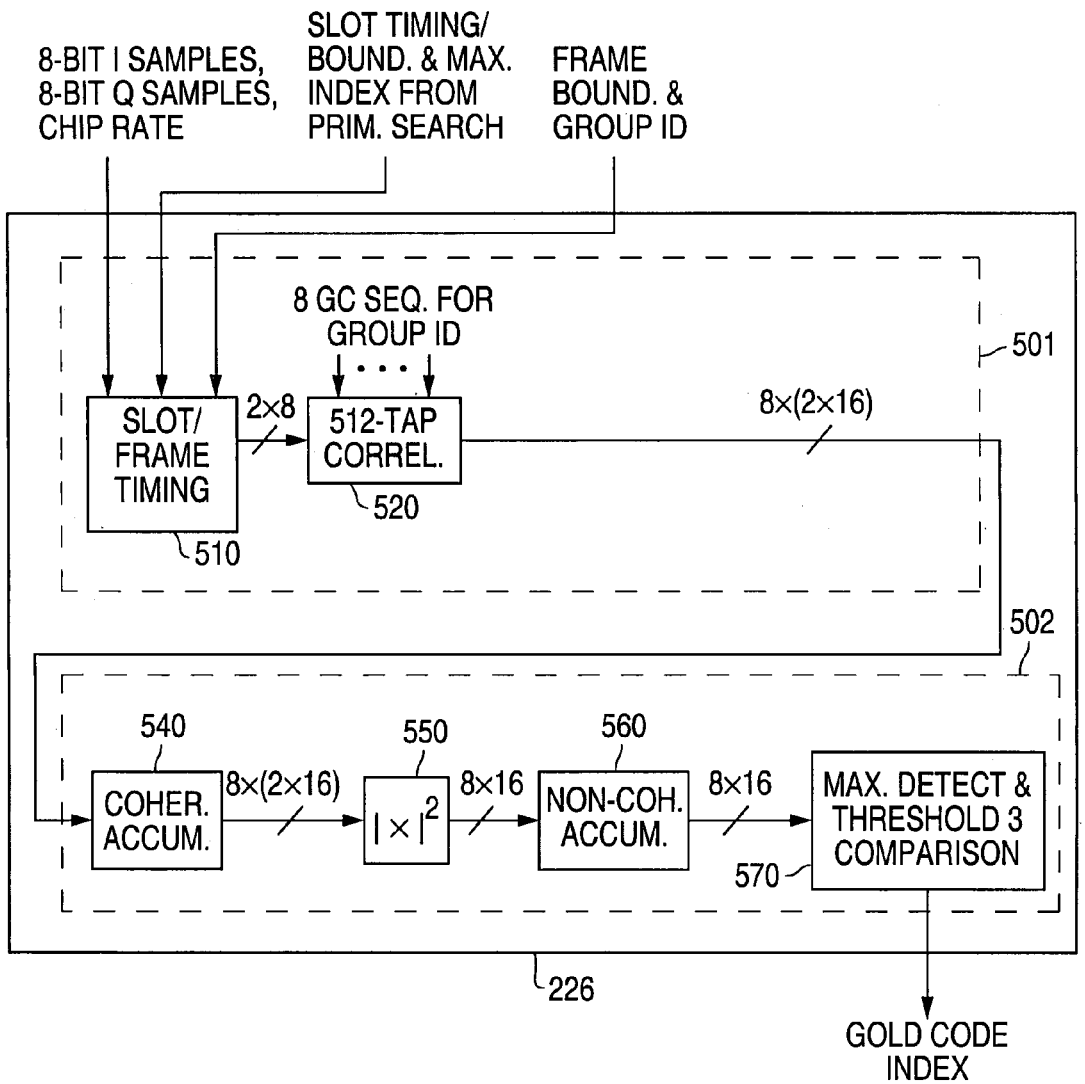
FIG. 5 is a detailed block diagram of the Gold code search stage of the exemplary mobile station receiver according to an exemplary embodiment of the present invention.

FIG. 5 is a detailed block diagram of Gold code search stage 226 of exemplary mobile station 111 according to an exemplary embodiment of the present invention. Gold code search stage 226 comprises frame timing block 510, correlator 520, coherent accumulator 540, squaring unit 550, non-coherent accumulator 560, and maximum detection and Threshold 3 comparison block 570. Dotted line boundary 501 indicates circuit blocks that may be implemented in hardware. Dotted line boundary 502 indicates circuit blocks that may be implemented in firmware.

Slot timing block 510 receives the 8-bit I samples and 8-bit Q samples from FIR filter 216 at the chip rate. Doubling sampling is not required since slot timing block 510 uses the frame and slot timing, Maximum Index information and Group ID from primary search stage 222 and secondary search stage 224 to properly align the received I and Q samples. In the initial search, there are $N_{SC}=8$ scrambling Gold codes for each group ID found by secondary search stage 224. The received common control pilot channel (CPICH) signal is correlated by 512-tap correlator 520 over $n_{co}$, symbols with all 8 scrambling codes for the detected code group ID from secondary search stage 224. The correlated output of correlator 520 comprises eight (8) separate 16-bit I signal values and eight (8) separate 16-bit Q signal values. The output of correlator 520 has a sample rate that is 1/512 of the I and Q sampling rate.

The eight pairs of 16-bit I and Q outputs of correlator 520 are summed by coherent accumulator 540. Squaring unit 550 squares the eight pairs of 16-bit outputs of coherent accumulator 540 to produce eight separate 16-bit quantities ($I^2+Q^2$). Then non-coherent accumulator 560 sums the eight outputs of squaring unit 550. Instead of using only coherent accumulation over a sequence of data, coherent accumulator 540 and non-coherent accumulator 560 are implemented in order to reduce the effect of frequency offset.

Maximum detection and Threshold 3 comparison block 570 finds the maximum value in each of the eight outputs of non-coherent accumulator 560 and compares the maximum values to Threshold 3. Only the highest maximum value at the output of non-coherent accumulator 560 that exceeds the Threshold 3 value is chosen. The Gold code that corresponds to the highest maximum value is the correct Gold code index. If the maximum value exceeds Threshold 3, the corresponding Gold code is reported to the finger management block as the cell-specific Gold code. Threshold 3 is computed by scaling the estimated received power with an amount that is obtained according to the length of coherent and non-coherent correlations in blocks 540 and 560.

Figure 6:
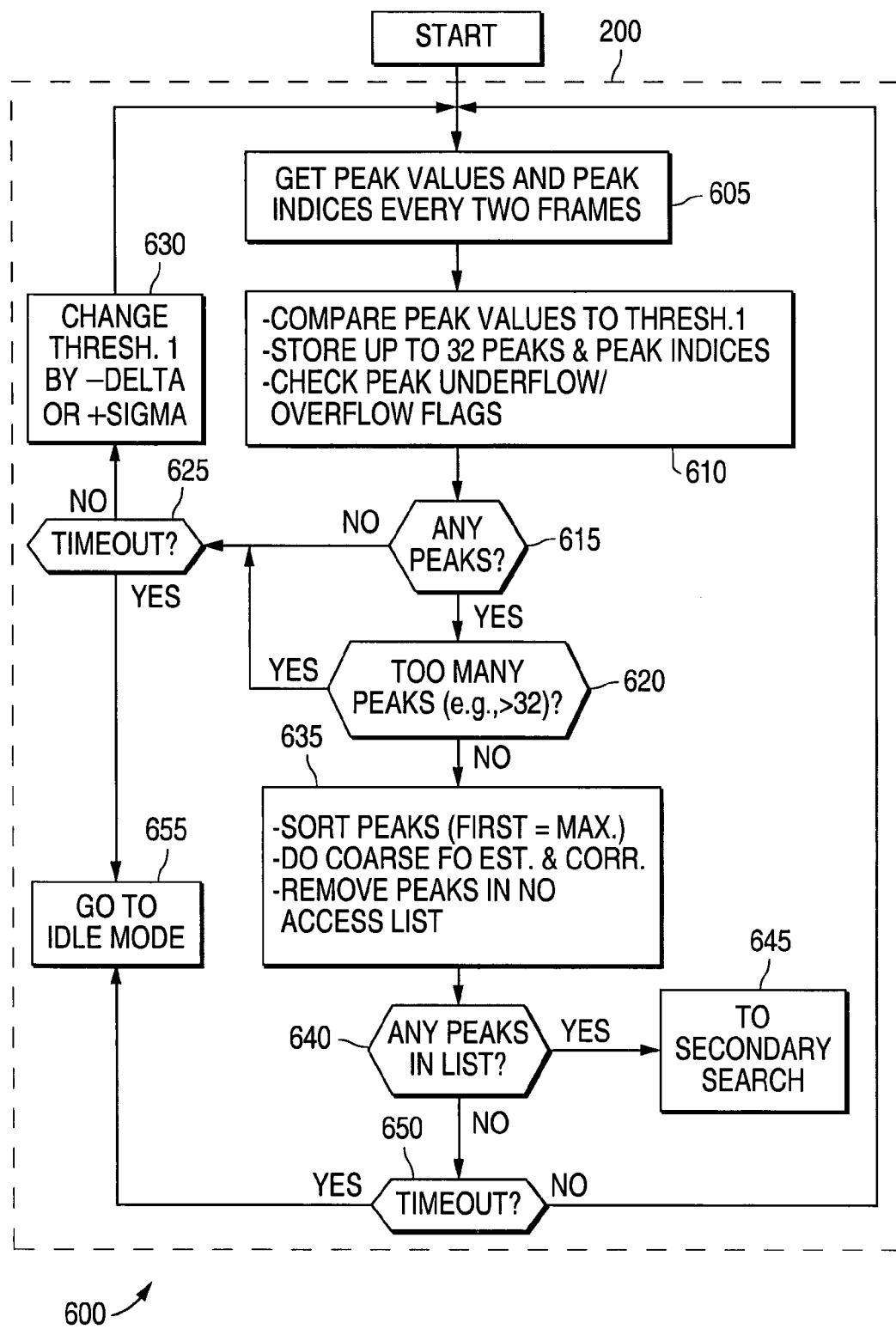
FIG. 6 is a flow diagram illustrating the operation of the primary search stage of the exemplary mobile station receiver according to an exemplary embodiment of the present invention.

FIG. 6 illustrates flow diagram 600, which depicts the operation of primary search stage 222 of exemplary mobile station 111 according to an exemplary embodiment of the present invention. Primary search stage 222 gets peak values and indices every two frames (process step 605). The peaks are compared to Threshold 1 (process step 610). If no peaks are detected, the underflow flag is set. If more than 32 peaks are detected, the overflow flag is set. If the underflow flag (i.e., no peaks exceed Threshold 1) is set (process step 615) or if the overflow flag (i.e., too many peaks exceed Threshold 1) is set (process step 620), primary search stage 222 determines if a timeout has occurred (process step 625). If a timeout has occurred, cell search block 220 goes to idle mode (process step 655). If a timeout has not occurred, primary search stage 222 changes Threshold 1 by $-\Delta$ (if no peak exceeds Threshold 1) or by $+\delta$ (if too many peaks exceed Threshold 1) (process step 630) and resumes getting new peaks and their indices (process step 605).

If some peaks exceed Threshold 1 (process step 615), but not too many peaks (process step 620), peak detector 350 of primary search stage 222 sorts the peaks and identifies the highest peak as the Maximum Index value. Receiver 200 performs coarse frequency offset estimation and correction using the Maximum index value. If any of the peaks correspond to a base station that is in the No-Access list, peak detector 350 removes the No-Access list peaks.

If no peaks remain after the No-Access list peaks are removed (process step 640), primary search stage 222 determines if a timeout has occurred (process step 650). If a timeout has occurred, cell search block 220 goes to idle mode (process step 655). If a timeout has not occurred, primary search stage 222 resumes getting new peaks and their indices (process step 605). If some peaks still remain after the No-Access list peaks are removed (process step 640), secondary search stage 224 is enabled (process step 645).

Figure 7:
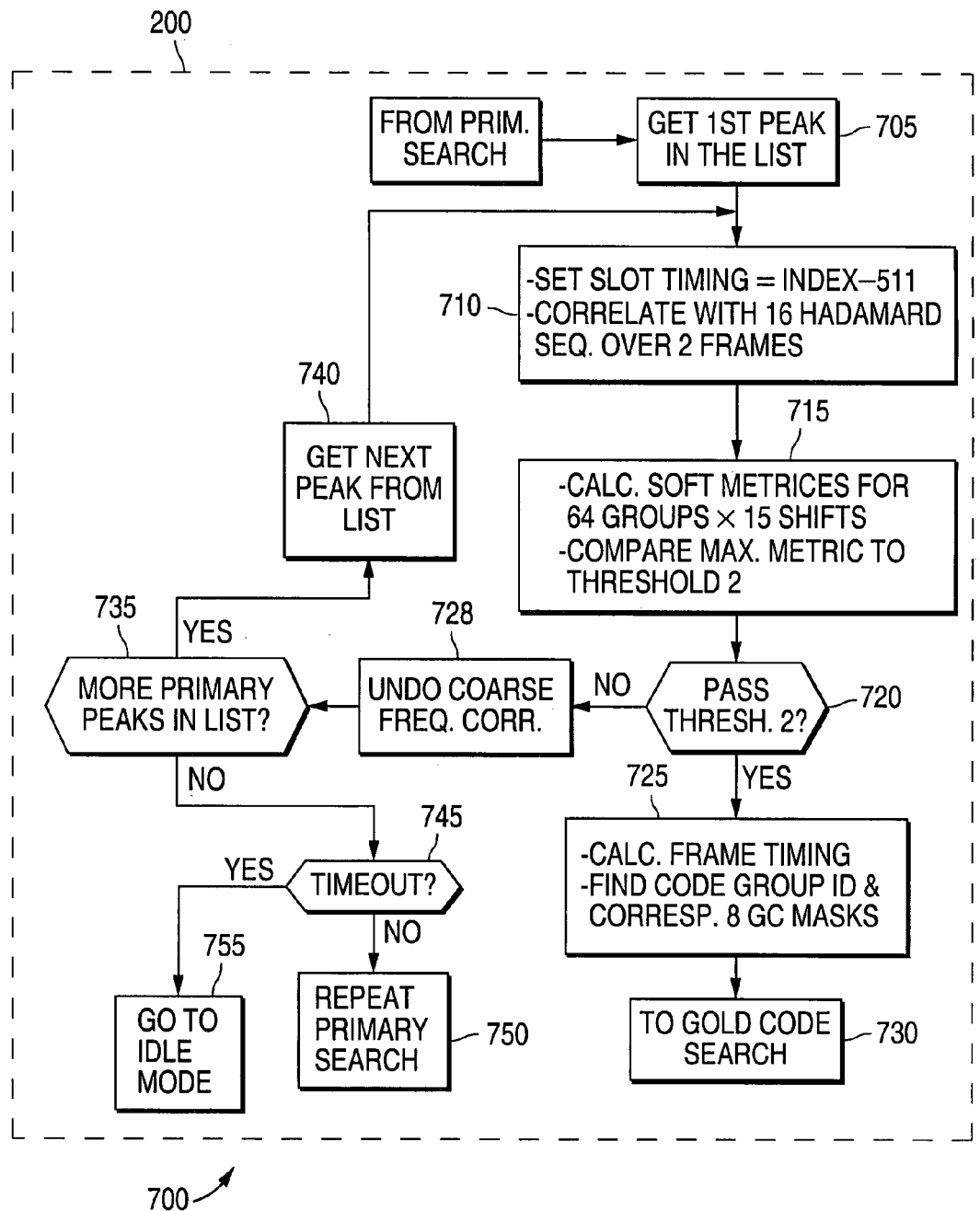
FIG. 7 is a flow diagram illustrating the operation of the secondary search stage of the exemplary mobile station receiver according to an exemplary embodiment of the present invention.

FIG. 7 illustrates flow diagram 700, which depicts the operation of secondary search stage 224 of exemplary mobile station 111 according to an exemplary embodiment of the present invention. Once enabled by primary search stage 222, secondary search stage 224 performs a correlation on the secondary synchronization channel (S-SCH) signal with the 256-bit sequence, z, in Equation 1 above. The correlated output is then correlated with 16 possible Hadamard sequences (process step 710). Soft metric values are calculated for all 16 Hadamard transform outputs across 15 time shifted versions of each of the 64 S-SCH signal code word groups. Then, the maximum metric is compared to Threshold 2 (process step 715).

If the maximum metric exceeds Threshold 2 (process step 720), secondary search stage 224 calculates the frame timing and determines from the corresponding Hadamard code the group ID of the maximum metric (process step 725). The frame timing and group ID are sent to Gold code search stage 226 (process step 730).

It is recalled that primary search stage 222 may identify more than one peak and that the peak values and indices for multiple peaks are transferred to secondary search stage 224. If the maximum metric does not exceed Threshold 2 (process step 720), secondary search stage 224 undoes the coarse frequency correction by changing the carrier frequency by the estimated frequency offset derived from the outputs of primary search stage 222, but in the opposite direction (process step 728). Secondary search stage 224 then determines if there are additional slot peaks from primary search stage 222 (process step 735). If there are more peaks, secondary search stage 224 gets the next peak from the list (process step 740) and re-performs correlation with the sequence, z, and the 16 possible Hadamard codes (process steps 710 and 715). If there are no more peaks in the list, secondary search stage 224 determines if a timeout has occurred (process step 745). If a time out has occurred, cell search block 220 goes to idle mode (process step 755). If a time out has not occurred, primary search stage 224 is repeated (process step 750).

Figure 8:
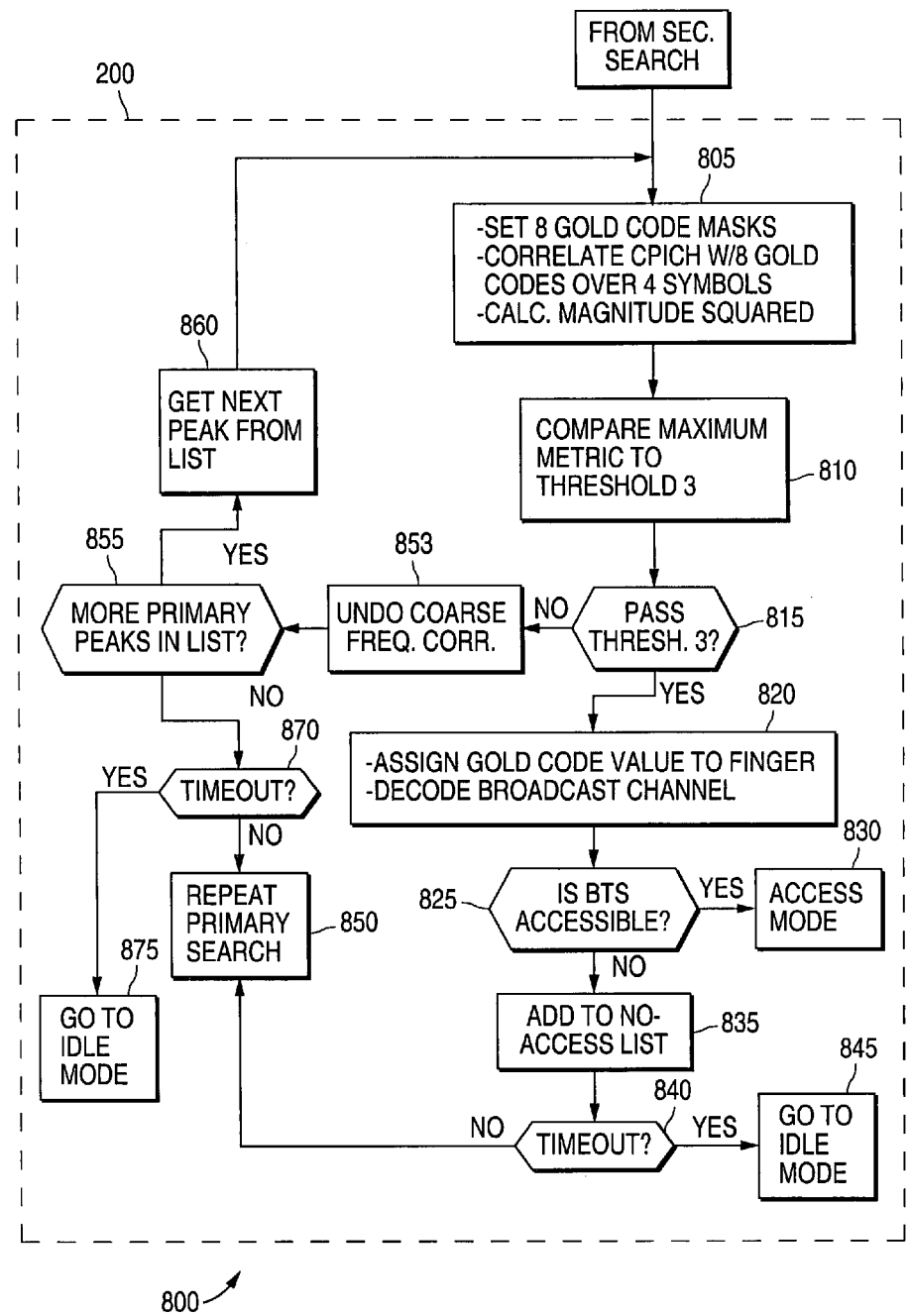
FIG. 8 is a flow diagram illustrating the operation of the Gold code search stage of the exemplary mobile station receiver according to an exemplary embodiment of the present invention.

FIG. 8 illustrates flow diagram 800, which depicts the operation of Gold code search stage 226 of exemplary mobile station 111 according to an exemplary embodiment of the present invention. Gold code search stage 226 performs multiple correlations on the common control pilot channel (CPICH) signal with the eight Gold codes identified by the Group ID data received from secondary search stage 224. The magnitudes of the correlator outputs are squared (process step 805). Soft metric values are calculated for all eight (8) Gold code sequence outputs. Then, the maximum metric is compared to Threshold 3 (process step 810).

If the maximum metric exceeds Threshold 3 (process step 815), Gold code search stage 226 assigns a Gold code to a Rake finger in receiver 200 to the detected BTS (process step 820) and decodes the broadcast channel. If the detected BTS is accessible, cell search block 220 goes into access mode (process step 830). If the detected BTS is not accessible, receiver 200 adds the detected BTS to the No-Access list (process step 835) and determines if a timeout has occurred (process step 840). If a time out has occurred, Gold code search stage 226 goes to idle mode (process step 845). If a time out has not occurred, primary search stage 224 is repeated (process step 850) until a timeout occurs (process step 870).

If the maximum metric does not exceed Threshold 3 (process step 815), Gold code search stage 226 undoes the coarse frequency correction by changing the carrier frequency by the estimated frequency offset derived from the outputs of primary search stage 222, but in the opposite direction (process step 853). Gold code search stage 226 then determines if there are additional slot peaks in the list from primary stage 222 (process step 855). If there are more peaks, the process gets the next peak (process step 860). If the last peak has been completed, Gold code search stage 226 determines if a timeout has occurred (process step 870). If a time out has occurred, Gold code search stage 226 goes to idle mode (process step 755). If a time out has not occurred, primary search stage 224 is repeated (process step 850).

Figure 9A:
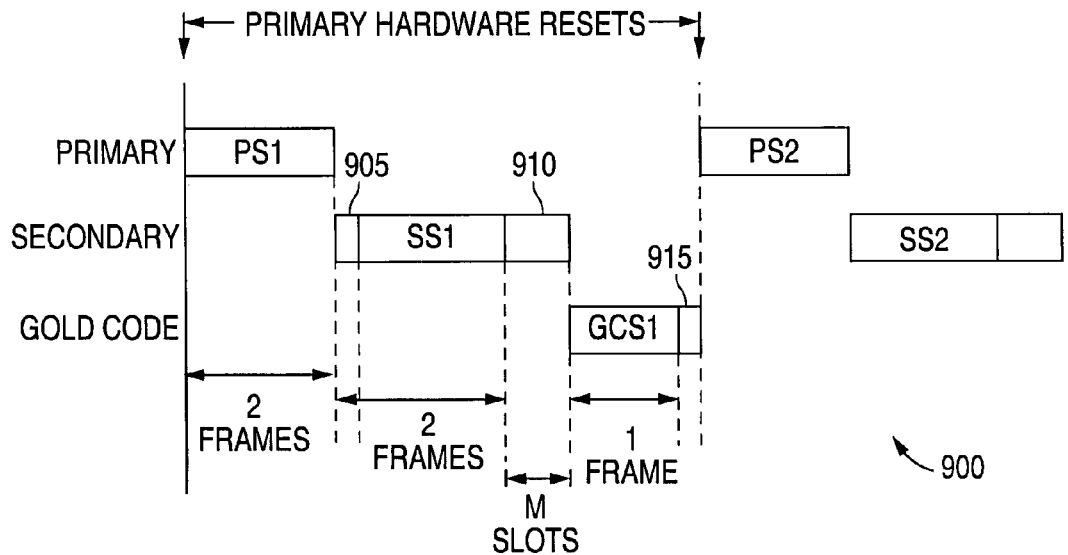
FIG. 9A is a timing diagram illustrating a cell search operation in a conventional mobile station receiver according to an exemplary embodiment of the prior art.

FIG. 9A depicts timing diagrams 900, which illustrates a cell search operation in a conventional mobile station receiver according to an exemplary embodiment of the prior art. As FIG. 9A illustrates, a first primary search phase (PS1), a first secondary search phase (SS1), and a first Gold code search phase (GCS1) execute serially before a second primary search phase (PS2) and a second secondary search phase (SS2) may occur. Block 905 indicates DSP processing time when the Maximum index value is being calculated. Block 910 indicates DSP processing time when the soft metrics in a prior art secondary search stage are being calculated. Block 915 indicates DSP processing time when the soft metrics in a prior art Gold code search stage are being calculated.

Figure 9B:
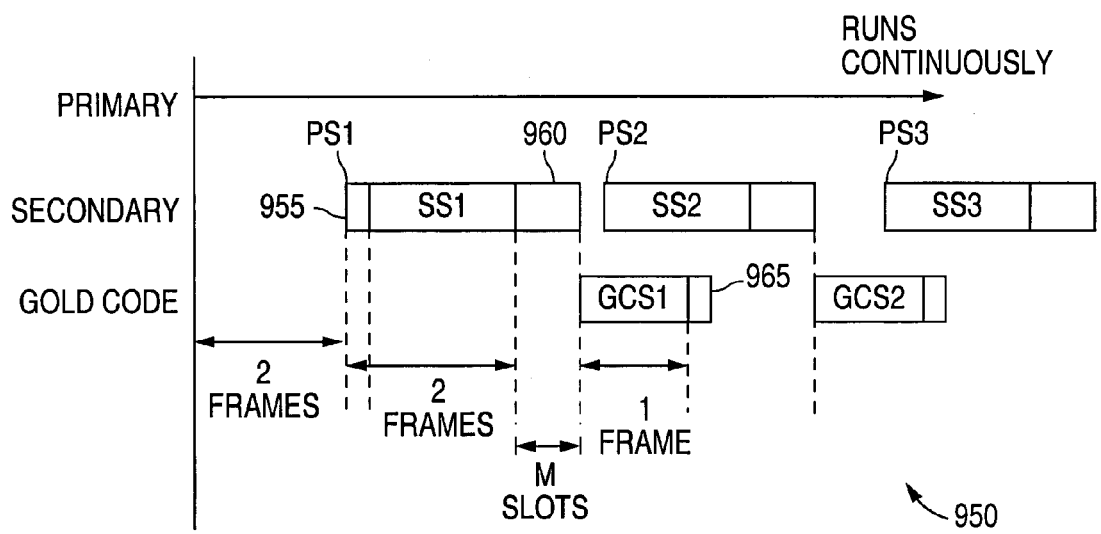
FIG. 9B is a timing diagram illustrating the operation of the pipelined cell search block of the exemplary mobile station receiver according to an exemplary embodiment of the present invention.

FIG. 9B depicts timing diagram 950, which illustrates the operation of pipelined cell search block 220 of exemplary mobile station 111 according to an exemplary embodiment of the present invention. As FIG. 9B illustrates, the primary search is continuously running. PS1, PS2, and PS3 represent instances when search results are available from primary search stage 222. Secondary search stage 224 starts when the peaks from primary search stage 222 are available. If the group ID and frame timing are successfully found in secondary search stage 224, Gold code search stage 226 then starts to find the suitable Gold code. While Gold code search stage 226 is running, secondary search stage 224 may produce a new group ID and frame timing for the next process in Gold code search stage 226. Block 955 indicates DSP processing time when the Maximum index value is being calculated. Block 960 indicates DSP processing time when the soft metrics in secondary search stage 224 are being calculated. Block 965 indicates DSP processing time when the soft metrics in Gold code search stage 226 are being calculated.

Although the present invention has been described with several embodiments, various changes and modifications may be suggested to one skilled in the art. It is intended that the present invention encompass such changes and modifications as fall within the scope of the appended claims.

What is claimed is:

1. An apparatus comprising:
   a first search stage configured to correlate a primary synchronization pattern with a signal to identify a slot boundary;
   a second search stage configured to correlate a secondary synchronization pattern with the signal using the identified slot boundary to identify a frame boundary and an identifier associated with a base station; and
   a third search stage configured to identify a Gold code index associated with the signal using the frame boundary, the slot boundary, and the identifier associated with the base station;
   wherein the first search stage comprises:
      a matched filter configured to receive I and Q samples associated with the signal and to generate filtered I and Q outputs;
      squaring units configured to square the filtered I and Q outputs to generate I and Q squared outputs;
      an adder configured to add the I and Q squared outputs to generate sample results;
      a buffer configured to store the sample results;
      a non-coherent accumulator configured to sum the sample results and to output accumulated sample values; and
      a peak detector configured to detect peaks in the accumulated sample values.

2. The apparatus of claim 1, wherein the first search stage is configured to identify the slot boundary by detecting a maximum peak in the correlation of the primary synchronization pattern with the signal.

3. The apparatus of claim 2, wherein the peak detector is further configured to compare the detected peaks to a threshold value and to identify the maximum peak from among one or more peaks that exceed the threshold value.

4. The apparatus of claim 1, wherein the second search stage is configured to identify the frame boundary and the identifier associated with the base station by detecting a maximum peak in the correlation of the secondary synchronization pattern with the signal.

5. The apparatus of claim 1, wherein the third search stage is configured to identify the Gold code index using a common control pilot channel (CPICH) signal.

6. The apparatus of claim 1, wherein at least two of the stages operate at least partially simultaneously.

7. The apparatus of claim 1, wherein:
   the second search stage is enabled by receipt of data defining the slot boundary; and
   the third search stage is enabled by receipt of data defining the frame boundary and the identifier associated with the base station.

8. An apparatus comprising:
   a first search stage configured to correlate a primary synchronization pattern with a signal to identify a slot boundary;
   a second search stage configured to correlate a secondary synchronization pattern with the signal using the identified slot boundary to identify a frame boundary and an identifier associated with a base station; and
   a third search stage configured to identify a Gold code index associated with the signal using the frame boundary, the slot boundary, and the identifier associated with the base station;
   wherein the second search stage comprises:
      a slot timing block configured to receive I and Q samples associated with the signal and to align the I and Q samples using the slot boundary;
      a complex correlator configured to correlate the aligned I and Q samples with a specified sequence to generate correlated outputs;
      a Hadamard transform block configured to perform a Hadamard transform using the correlated outputs to generate signal outputs;
      squaring units configured to square the signal outputs to generate squared outputs;
      a buffer configured to store the squared outputs;
      an accumulator configured to sum the squared outputs in the buffer and to output accumulated values;
      a soft metric calculation block configured to generate metrics based on the accumulated values; and
      a maximum detection block configured to detect a maximum metric generated by the soft metric calculation block.

9. The apparatus of claim 8, wherein the maximum detection block is further configured to determine if the maximum metric exceeds a threshold.

10. An apparatus comprising:
   a first search stage configured to correlate a primary synchronization pattern with a signal to identify a slot boundary;
   a second search stage configured to correlate a secondary synchronization pattern with the signal using the identified slot boundary to identify a frame boundary and an identifier associated with a base station; and
   a third search stage configured to identify a Gold code index associated with the signal using the frame boundary, the slot boundary, and the identifier associated with the base station;
   wherein the third search stage comprises:
      a slot timing block configured to receive I and Q samples associated with the signal and to align the I and Q samples using the slot and frame boundaries;
      a correlator configured to correlate the aligned I and Q samples with a plurality of Gold codes to generate correlated outputs, the plurality of Gold codes related to the identifier associated with the base station;

a coherent accumulator configured to sum the correlated outputs and to output first accumulated values;

a squaring unit configured to square the first accumulated values to generate squared values;

a non-coherent accumulator configured to sum the squared values and to output second accumulated values; and a maximum detection block configured to detect a maximum value in the second accumulated values, wherein the identified Gold code index is based on the maximum value in the second accumulated values.

11. The apparatus of claim 10, wherein the maximum detection block is further configured to determine if the maximum value in the second accumulated values exceeds a threshold, wherein the identified Gold code index is based on the maximum value in the second accumulated values that exceeds the threshold.

12. A receiver comprising:

a front-end configured to receive an incoming signal and to down-convert the incoming signal to an intermediate frequency signal; and a cell search apparatus comprising:

a first search stage configured to correlate a primary synchronization pattern with the intermediate frequency signal to identify a slot boundary;

a second search stage configured to correlate a secondary synchronization pattern with the intermediate frequency signal using the identified slot boundary to identify a frame boundary and an identifier associated with a base station, the base station associated with the incoming signal; and a third search stage configured to identify a Gold code index associated with the incoming signal using the frame boundary, the slot boundary, and the identifier associated with the base station;

wherein the first search stage comprises:

a matched filter configured to receive I and Q samples associated with the intermediate frequency signal and to generate filtered I and Q outputs;

squaring units configured to square the filtered I and Q outputs to generate I and Q squared outputs;

an adder configured to add the I and Q squared outputs to generate sample results;

a buffer configured to store the sample results;

a non-coherent accumulator configured to sum the sample results and to output accumulated sample values; and a peak detector configured to detect peaks in the accumulated sample values.

13. The receiver of claim 12, wherein:

the first search stage is configured to identify the slot boundary by detecting a first maximum peak in the correlation of the primary synchronization pattern with the intermediate frequency signal;

the second search stage is configured to identify the frame boundary and the identifier associated with the base station by detecting a second maximum peak in the correlation of the secondary synchronization pattern with the intermediate frequency signal; and the third search stage is configured to identify the Gold code index using a common control pilot channel (CPICH) signal within the intermediate frequency signal.

14. The receiver of claim 12, wherein the third search stage comprises:

a slot timing block configured to receive I and Q samples associated with the intermediate frequency signal and to align the I and Q samples using the slot and frame boundaries;

a correlator configured to correlate the aligned I and Q samples with a plurality of Gold codes to generate correlated outputs, the plurality of Gold codes related to the identifier associated with the base station;

a coherent accumulator configured to sum the correlated outputs and to output first accumulated values;

a squaring unit configured to square the first accumulated values to generate squared accumulated values;

a non-coherent accumulator configured to sum the squared accumulated values and to output second accumulated values; and a maximum detection block configured to detect a maximum value in the second accumulated values and to determine if the maximum value in the second accumulated values exceeds a threshold, wherein the identified Gold code index is based on the maximum value in the second accumulated values that exceeds the threshold.

15. The receiver of claim 12, wherein:

the first search stage is configured to continuously correlate the primary synchronization pattern with the intermediate frequency signal; and the second and third search stages are configured to repeatedly correlate the secondary synchronization pattern with the intermediate frequency signal and to identify the Gold code index in an overlapping manner.

16. A receiver comprising:

a front-end configured to receive an incoming signal and to down-convert the incoming signal to an intermediate frequency signal; and a cell search apparatus comprising:

a first search stage configured to correlate a primary synchronization pattern with the intermediate frequency signal to identify a slot boundary;

a second search stage configured to correlate a secondary synchronization pattern with the intermediate frequency signal using the identified slot boundary to identify a frame boundary and an identifier associated with a base station, the base station associated with the incoming signal; and a third search stage configured to identify a Gold code index associated with the incoming signal using the frame boundary, the slot boundary, and the identifier associated with the base station;

wherein the second search stage comprises:

a slot timing block configured to receive I and Q samples associated with the intermediate frequency signal and to align the I and Q samples using the slot boundary;

a complex correlator configured to correlate the aligned I and Q samples with a specified sequence to generate correlated outputs;

a Hadamard transform block configured to perform a Hadamard transform using the correlated outputs to generate signal outputs;

squaring units configured to square the signal outputs to generate squared outputs;

a buffer configured to store the squared outputs;

an accumulator configured to sum the squared outputs in the buffer and to output accumulated values;

a soft metric calculation block configured to generate metrics based on the accumulated values; and a maximum detection block configured to detect a maximum metric generated by the soft metric calculation block and to determine if the maximum metric exceeds a threshold.

17. A method comprising:

receiving a signal at a wireless device;

identifying a slot boundary in the signal by correlating a primary synchronization pattern with the signal at the wireless device;

identifying a frame boundary in the signal and an identifier associated with a base station by correlating a secondary synchronization pattern with the signal using the identified slot boundary at the wireless device, the base station associated with the signal; and identifying a Gold code index associated with the signal using the frame boundary, the slot boundary, and the identifier associated with the base station at the wireless device, wherein identifying the Gold code index comprises:

receiving I and Q samples associated with the signal;

aligning the I and Q samples using the slot and frame boundaries;

correlating the aligned I and Q samples with a plurality of Gold codes to generate correlated outputs, the plurality of Gold codes related to the identifier associated with the base station;

summing the correlated outputs to produce first accumulated values;

squaring the first accumulated values to generate squared values;

summing the squared values to produce second accumulated values; and detecting a maximum value in the second accumulated values, wherein the identified Gold code index is based on the maximum value in the second accumulated values.

18. The method of claim 17, wherein:

identifying the slot boundary comprises detecting a first maximum peak in the correlation of the primary synchronization pattern with the signal;

identifying the frame boundary and the identifier associated with the base station comprises detecting a second maximum peak in the correlation of the secondary synchronization pattern with the signal; and identifying the Gold code index comprises identifying the Gold code index using a common control pilot channel (CPICH) signal.

19. The method of claim 18, wherein:

identifying the slot boundary further comprises comparing the first maximum peak to a first threshold level;

identifying the frame boundary and the identifier associated with the base station further comprises comparing the second maximum peak to a second threshold level; and identifying the Gold code index further comprises comparing a third maximum peak associated with the CPICH signal to a third threshold level.

20. The method of claim 17, wherein:

identifying the slot boundary in the signal comprises continuously correlating the primary synchronization pattern with the signal; and identifying the frame boundary in the signal and the identifier associated with the base station occurs in an overlapping manner with identifying the Gold code index.

\* \* \* \* \*

UNITED STATES PATENT AND TRADEMARK OFFICE
CERTIFICATE OF CORRECTION

PATENT NO. : 7,580,428 B1  
APPLICATION NO. : 11/725575  
DATED : August 25, 2009  
INVENTOR(S) : Karim Nassiri-Toussi, Mohammad Reza Shikh-Bahaei and Ali D. Pirooz Page 1 of 1

It is certified that error appears in the above-identified patent and that said Letters Patent is hereby corrected as shown below:

Column 1, line 66, delete "is".

Signed and Sealed this

Eighteenth Day of May, 2010

David J. Kappos
*Director of the United States Patent and Trademark Office*